United States Patent Office

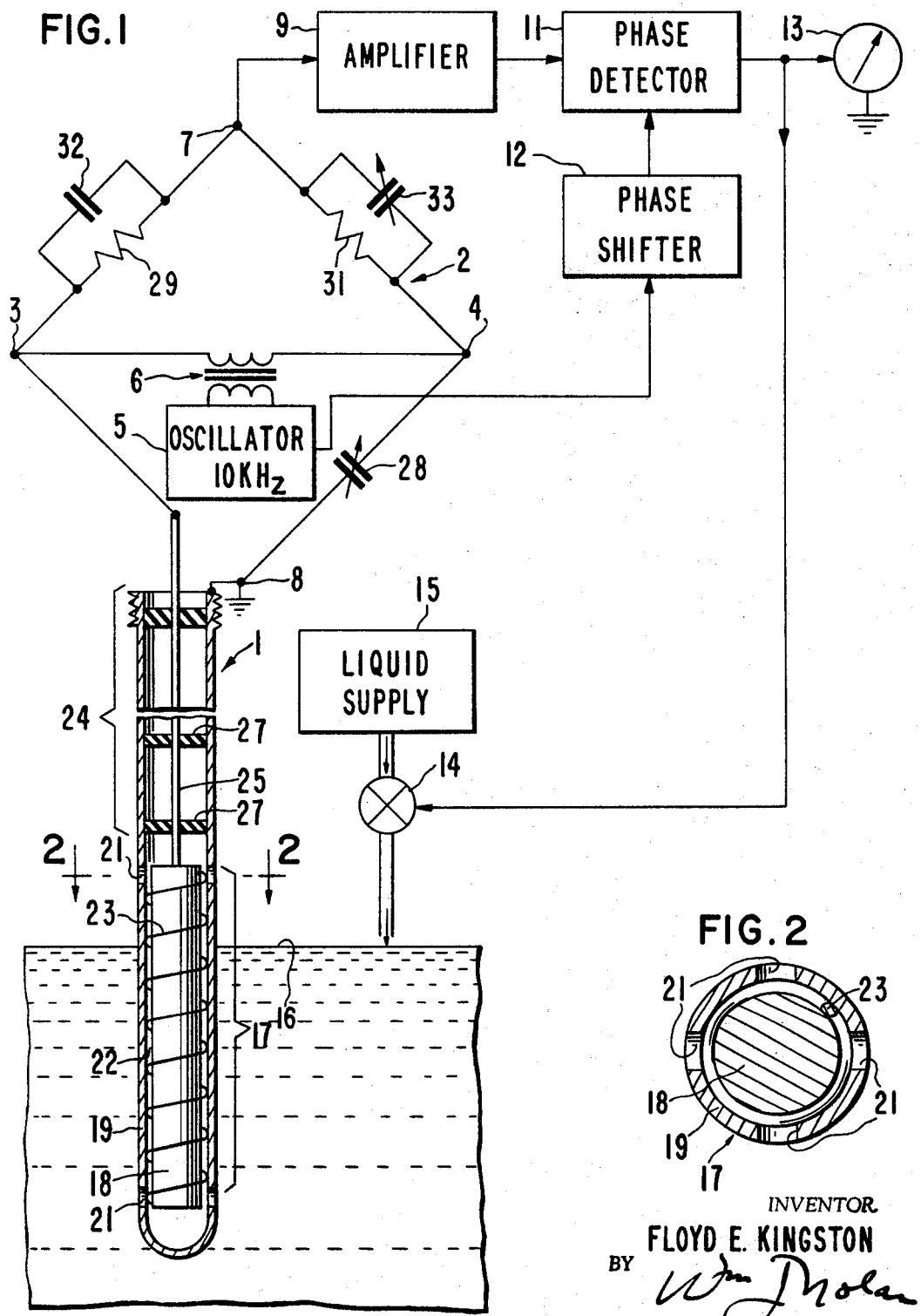
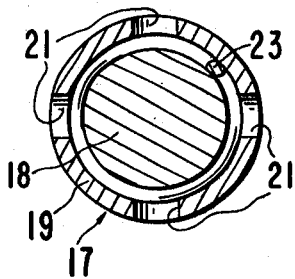

3,391,547
Patented July 9, 1968

3,391,547
CAPACITIVE LIQUID LEVEL SENSOR USING PHASE SENSITIVE DETECTOR MEANS
Floyd E. Kingston, Palo Alto, Calif., assignor to Varian Associates, Palo Alto, Calif., a corporation of California
Filed Feb. 28, 1966, Ser. No. 530,543
8 Claims. (Cl. 62—218)

ABSTRACT OF THE DISCLOSURE

A capacitive type liquid level detector is disclosed. A liquid level detector employs a capacitive measuring probe inserted into the fluid, the level of which is to be measured. The capacitive probe is in one arm of an A.C. bridge. The output of the A.C. bridge is fed to one input of a phase sensitive detector wherein it is compared with the A.C. frequency employed to excite the bridge. A phase shifter is provided for shifting the phase of the bridge unbalance signal or the reference frequency signal such that the pure capacitive unbalance of the bridge can be measured. The output of the phase sensitive detector is a D.C. signal having an amplitude corresponding to the liquid level and a phase corresponding to the sense that the liquid level departs from some predetermined reference level. The output D.C. signal, corresponding to the liquid level, may be measured and indicated to give an indication of the liquid level. In addition, a portion of the D.C. output unbalance signal may be fed to a control valve for controlling the liquid level being measured.

Heretofore, capacitive type liquid level sensing probes have been used as one element in an R.F. bridge circuit. The liquid level is measured by sensing the change in capacity of the capacitive liquid level sensing probe as manifested by a detected unbalance of the bridge. One of the major problems with the prior bridge circuits has been that the transformer, used to couple the bridge exciting energy into the bridge, introduced temperature sensitive resistive unbalances into the bridge which could not be discerned from capacity changes in the probe thereby producing errors in the detected liquid level. Moreover, the prior output unbalance signals from the bridge were ambiguous in the sense that they merely indicated the magnitude of the unbalance and not the sense of the unbalance, i.e., whether the capacity of the probe increased or decreased. This ambiguity was overcome to some extent by operating the bridge about a range substantially to one side of balance and then bucking out the unbalance signal and using the sense of the change from the bucked out signal level to indicate an increase or decrease in the liquid level. While this expedient permitted detection of the sense of the change in liquid level it reduced the operating range of the bridge and also introduced the possibility that the liquid level could change sufficiently such that the bridge would pass through the balanced condition giving a phase reversal in the output indicating a rise in liquid level when in fact it was decreasing.

In the present invention the unbalance signal of the bridge is phase sensitive detected such that only capacitive unbalances of the bridge are detected thereby eliminating errors in liquid level measurement due to variable resistive effects. Also the phase sensitive detection gives an unambiguous output signal indicating whether the liquid level is above or below a certain predetermined balanced level for the bridge.

The principal object of the present invention is the provision of an improved liquid level sensing and/or indicating system.

One feature of the present invention is the provision of a phase sensitive detector for detecting the unbalance signal from the bridge, whereby the output is rendered insensitive to resistive unbalances of the bridge and the liquid level is unambiguously determined relative to a predetermined reference level.

Another feature of the present invention is the provision of a dielectric filament serving as a spacer between the capacitor members of the capacitive liquid level sensing probe, whereby the mechanical and electrical stability of the probe is enhanced.

Other features and advantages of the present invention will become apparent upon a perusal of the following specification taken in connection with the accompanying drawings wherein:

FIG. 1 is a schematic diagram of a liquid level indicating and control system incorporating features of the present invention, and FIG. 2 is an enlarged sectional view of a portion of the structure of FIG. 1 taken along line 2—2 in the direction of the arrows.

Referring now to the drawings, a capacitive liquid level sensing probe 1 is connected as one arm of a Wheatstone bridge 2. The bridge 2 is excited across input terminals 3 and 4 by A.C. current derived from a 10 kHz. oscillator 5 via transformer 6. The output of the bridge 2 at 10 kHz. is taken across terminals 7 and 8 and amplified in an operational amplifier 9 such as a Fairchild model $\mu$A–709. The amplified output is fed to one input terminal of a phase sensitive detector 11 wherein it is compared to the phase of a reference signal at 10 kHz. derived from the A.C. suorce 5 via a variable phase shifter 12.

The output of the phase sensitive detector is a D.C. signal the phase of which is determinative of whether the liquid level, as measured by the probe 1, is above or below a reference level as determined by the balanced condition of the bridge 2. The magnitude of the D.C. output signal is determinative of the amount the liquid level departs from the preselected reference level.

This output signal is fed to a D.C. meter 13 to give a visual indication of the liquid level. Alternatively, the D.C. output signal may be applied to a control valve 14 for letting in more or less liquid, such as for example liquid helium or nitrogen from a liquid supply 15 to maintain a preselected liquid level 16 in a utilization device, such as for example a dewar, as measured by the probe 1.

The liquid level sensing probe 1 comprises a capacitor portion 17 as of 240 pf. containing essentially all the capacity of the probe 1. The capacitor portion is formed by a pair of coaxially disposed axially coextensive conductive members 18 and 19 as of stainless steel. The inner member is for example 35 cm. in length and 0.312" in outside diameter. The outer tubular member 19 as of 0.020" wall thickness is perforated at 21 over the length of the inner member to permit the liquid, in which the probe 1 is immersed and the level of which is to be measured, to fill the hollow cylindrical column or gap 22 as of 0.013" in thickness between the capacitor members 18 and 19 to a level indicative of the liquid level 16 inside the device containing same such as for example a liquid helium or nitrogen dewar.

The liquid in the gap 22 changes the capacity of the capaictor portion 17 of the probe 1 by as much as 10 pf. in variable accordance with the level to which it rises in the capacitor portion 17. This capacity is measured by the bridge 2 to give the output signal determinative of the liquid level.

A dielectric filament 23 as of 0.010" diameter tetrafluoroethylene resin is provided in the 0.013" gap 22 between the capacitor members 18 and 19 to provide increased mechanical and thus electrical stability for the capacitor 17. In a preferred embodiment the filament 23 is helically wound around the exterior of the inner capacitor member 18.

The capacitor 17 of the probe 1 is connected into one arm of the bridge 2 via a length of coaxial line 24 formed by a center conductor 25 connected at one end to the inner capacitor member 18 and at the other end to terminal 3 of the bridge. The outer conductor 26 of the coaxial line is formed by the upper part of the capacitor tube 19 and is connected to terminal 8 of the bridge 2 which terminal is also grounded. Insulating disks 27 are provided in the coaxial line to maintain the center position of the center conductor 25.

A variable capacitor 28 of a magnitude equal to the 240 pf. of the probe 1 is connected across terminals 4 and 8 of the bridge 2 to balance out the capacity of the probe 1 and to thereby set the zero reference liquid level for the probe 1. A pair of resistors 29 and 31 as of 6.8 KΩ are connected in the other arms of the bridge 2. The resistance of the resistors 29 and 31 is equal in magnitude to the reactive component of the impedance of the probe 1 and capacitor 28 at the 10 kHz. operating frequency of the bridge 2, whereby the bridge is balanced for capacitive effects. Capacitors 32 and 33 as of 5 pf. are connected across resistors 29 and 31, respectively, for balancing out resistive effects in the probe 1 and resistive losses in the transformer 6 which appear across the capacitive arms of the bridge to ground. It is desirable to balance out the aforementioned resistive unbalancing effects, even though the phase sensitive detector 11 permits measurement of the capacity unbalance to the exclusion of the resistive components, because they can produce such a large output bridge unbalance signal that they saturate the amplifier 9.

The liquid level sensing and indicating system of the present invention has permitted sensing the liquid level to ±0.25 cm. over a 35 cm. range of levels.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A liquid level sensing apparatus including, means forming a capacitive liquid level sensing probe adapted to contain a column of liquid to a level which rises and falls in accordance with a liquid level to be sensed, the liquid in said probe means serving to change the capacity of the probe in variable accordance with its level therein, means forming an electrical bridge network including said probe means as an element thereof, means forming a source of A.C. current connected to said bridge network such that changes in the capacity of said probe produce an A.C. output signal from said bridge, the improvement comprising, a phase sensitive detecting means for comparing the phase of the bridge output A.C. signal with the phase of the A.C. applied to the bridge to produce a D.C. output signal having a phase determinative of the sense of the liquid level relative to a predetermined reference and a magnitude determinative of the amount the liquid level departs from the reference.

2. The apparatus according to claim 1 including means forming a phase shifter for shifting the phase of one of the inputs to said phase sensitive detector relative to the other whereby the capacitive unbalance of the bridge is detectable to the exclusion of resistive unbalances.

3. The apparatus according to claim 1 including an inductive transformer means serving to couple the exciting A.C. current from said source to said bridge means.

4. The apparatus according to claim 1 wherein said capacitive probe means includes a pair of spaced apart coaxially disposed conductive members defining the capacitor portion of said capacitive probe means, and a dielectric filament disposed between said coaxial conductive members serving as a spacer between said pair of members of said capacitor portion to provide enhanced mechanical and electrical stability for said probe means.

5. The apparatus according to claim 1 in combination with a liquid coolant dewar for sensing the liquid coolant level in said dewar.

6. The apparatus according to claim 5 including means for supplying liquid coolant to said dewar in response to an input, and means for applying the output of said phase sensitive detector means to said coolant supply means for controlling the liquid coolant level in said dewar.

7. The apparatus according to claim 1 including, means for measuring and indicating the amplitude of the D.C. output signal of said phase sensitive detector, whereby the liquid level is indicated.

8. The apparatus according to claim 4 wherein said dielectric filament is wound in a helix inside the gap between the inner and outer conductor members of said capacitor portion.

References Cited
UNITED STATES PATENTS

| 2,802,975 | 8/1957 | Weber | 73—304 XR |
| 2,968,180 | 1/1961 | Schafer | 73—304 |
| 3,050,999 | 8/1962 | Edwards | 73—304 |
| 3,151,468 | 10/1964 | Martin | 62—55 |
| 3,321,971 | 5/1967 | Llewellyn | 73—304 |

MEYER PERLIN, *Primary Examiner.*